E. R. FELLOWS.
MEANS FOR GENERATING THE TEETH OF IRREGULAR GEARS.
APPLICATION FILED MAR. 11, 1914.
1,221,432.
Patented Apr. 3, 1917.
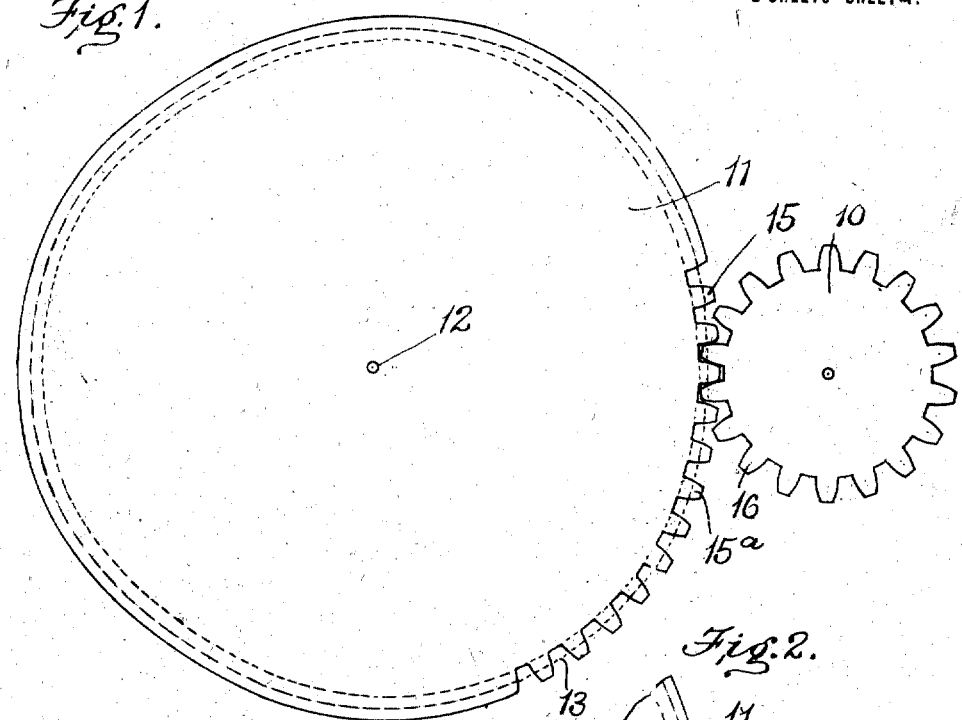
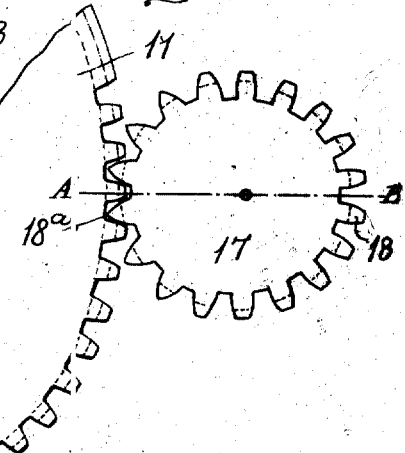
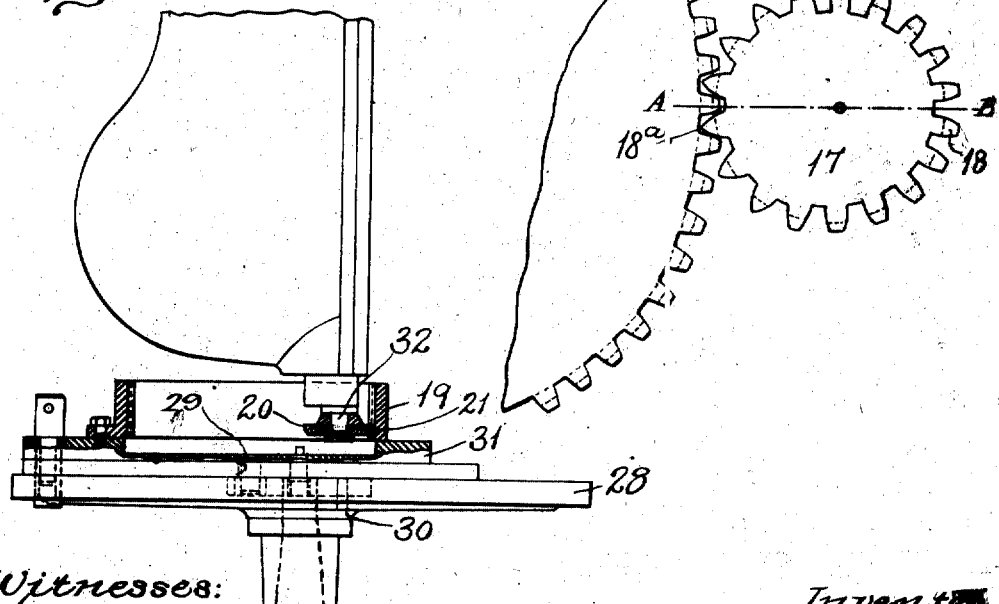

E. R. FELLOWS.
MEANS FOR GENERATING THE TEETH OF IRREGULAR GEARS.
APPLICATION FILED MAR. 11, 1914.
1,221,432.
Patented Apr. 3, 1917.
2 SHEETS—SHEET 2.
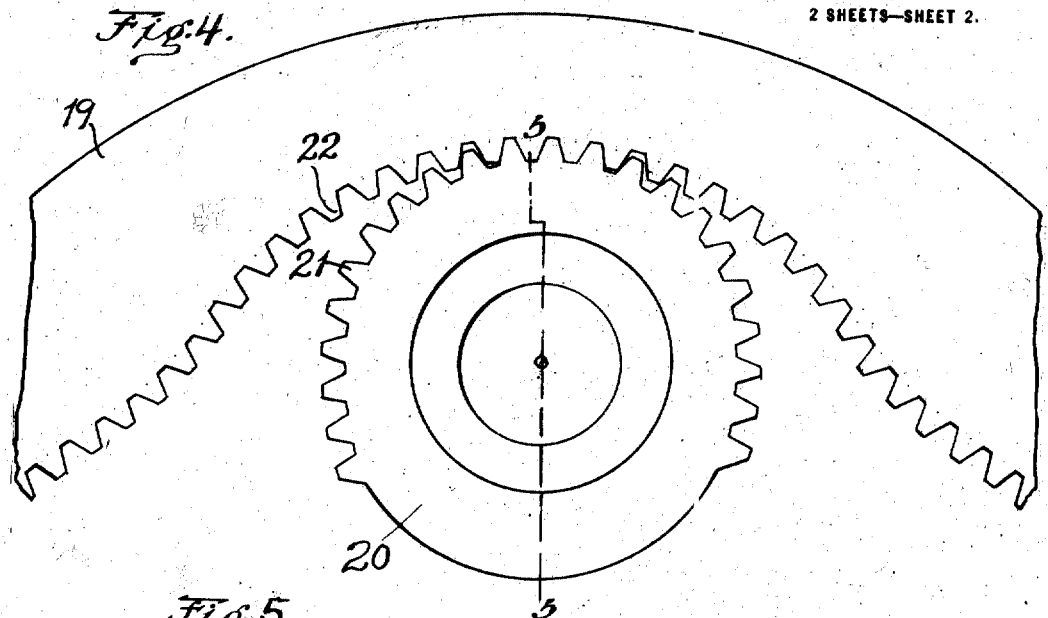
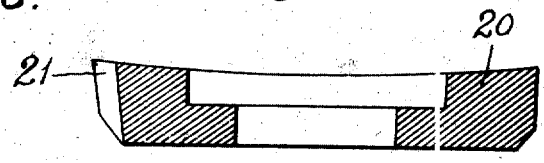
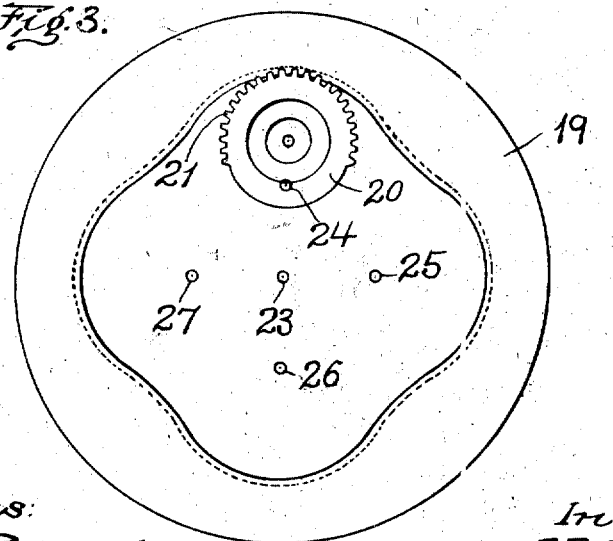
Witnesses:
Inventor
E. R. Fellows

UNITED STATES PATENT OFFICE.

EDWIN R. FELLOWS, OF SPRINGFIELD, VERMONT, ASSIGNOR TO THE FELLOWS GEAR SHAPER COMPANY, OF SPRINGFIELD, VERMONT, A CORPORATION OF VERMONT.

MEANS FOR GENERATING THE TEETH OF IRREGULAR GEARS.

1,221,432.  Specification of Letters Patent.  Patented Apr. 3, 1917.

Application filed March 11, 1914. Serial No. 824,029.

*To all whom it may concern:*

Be it known that I, EDWIN R. FELLOWS, a citizen of the United States, and resident of Springfield, in the county of Windsor and State of Vermont, have invented certain new and useful Improvements in Means for Generating the Teeth of Irregular Gears, of which the following is a specification.

The present invention relates to the art, heretofore developed by myself, of generating and cutting teeth in a gear blank by the operation of a planing cutter having peripheral projections similar to the teeth of a spur gear, which is reciprocated across the edge of the blank so as to cut tooth grooves or spaces, and is rotated simultaneously with the blank to generate the curves of the teeth thus formed in the work. In the art as heretofore practised the cutter and the work or gear blank are rotated about fixed axes; that is, such axes are at an invariable distance apart while the cutting progresses, after the cutter has been fed to the proper depth in the work. The object of the present invention is to provide a cutter capable of generating and cutting all, or a considerable portion of, the teeth of an irregular gear in the manner indicated without requiring the distance between its axis and the rotational axis of the work to be altered, such cutter having tooth-like peripheral projections so formed and positioned with respect to its axis that the teeth which they generate and cut in the work are adapted to mesh with a gear of regular form. In order to explain more fully the purpose of the invention and the principles of the means in which such invention is embodied, it may be stated that recent developments in gearing have produced a geared couple or pair comprising a gear of irregular form and a pinion or gear of regular form meshing therewith. The irregular gear has its teeth arranged on a line which is not concentric with the axis of the gear, but includes two or more lobes, that is portions which are curved about centers other than such axis. By "axis" in this connection I mean the point within the circuit of the pitch line of the gear about which either the gear is designed to rotate when arranged for rotation, or a pinion meshing with the gear is designed to revolve, when the gear is held stationary and the pinion is caused to travel in a planetary manner about it. Such an irregular gear has been termed in the art a multi-lobed gear and will be so termed hereafter in this description. The pinion with which the multi-lobed gear is required to mesh is a pinion of regular form, having its teeth all alike and equally spaced upon the pitch circle, such pinion being termed for the purposes of this description a standard pinion. In the running of such a geared couple one of the members, ordinarily the pinion, must have a movement toward and from the axis of the other member according as the teeth of the irregular gear are nearer to or farther from the axis of the gear. The multi-lobed gear may have many shapes and forms according to the use for which it is designed, and may have either external or internal teeth. Whatever its form, however, its teeth, or some of them, are irregular in shape in order to mesh with the regular teeth of a standard pinion, and they are necessarily so on account of the fact that the pitch line on which the gear teeth are located varies in its distance from the axis of the gear and is curved about other centers than such axis. The end served by the present invention is to provide a cutter having tooth-like projections which are so shaped, and located at such distances from the axis of the cutter, as to be capable when the cutter and gear blank are rotated or indexed about fixed axes, of generating the teeth on one of the lobes of the irregular gear in such form that the teeth of the gear will be conjugate to, and so capable of meshing properly with, the teeth of a standard pinion.

In the accompanying drawings I have shown two different forms of irregular, or multi-lobed gear, each adapted to mesh with the standard pinion, and in connection therewith I have shown cutters having peripheral projections shaped so as to generate properly the curves in the teeth of a lobe of each gear. The forms of irregular gear illustrated are simply two of the many forms which such a gear might have and are chosen to illustrate the variety of forms in which the essentials of the invention may be embodied without attempting to show all of such forms.

Figure 1 is a plan view of a geared pair consisting of a standard pinion and an irregular gear of three lobes, such lobes being symmetrically spaced about the axis of the gear and being similar to one another.

Fig. 2 is a view showing that part of the irregular gear which is represented as meshing with the pinion in Fig. 1, and showing also the cutter which is capable of generating and cutting the teeth of the gear.

Fig. 3 is a plan view of another form of irregular gear and of the cutter conjugate thereto in operative relationship with the teeth which it is adapted to cut.

Fig. 4 is a plan view on an enlarged scale of the cutter illustrated in Fig. 3.

Fig. 5 is a cross section on line 5—5 of Fig. 4.

Fig. 6 is a fragmentary elevation of part of the gear cutting machine in which my improved cutter is used, showing the coöperative relationship between the cutter and work.

The same reference characters indicate the same parts in all the figures.

Referring to Fig. 1, 10 represents a standard spur pinion having regular teeth each of which is exactly like every other one. 11 represents an irregular or multi-lobed gear adapted to mesh with, and to drive or be driven by, the pinion 10 and rotating about its geometric center 12. This gear is an external spur gear of three equal and symmetrical lobes, and the pitch line 13 on which the teeth are spaced is irregular, that is, unequally distant at different points from the center of rotation of the gear. The teeth 15 of the gear are conjugate to the teeth 16 of the pinion so as to make proper rolling contact with the latter teeth when rotating in either direction. In consequence the teeth 15 are irregular and vary more or less from one another, certain of the teeth being symmetrical and regular while others are unsymmetrical. Those teeth which are on parts of the pitch line tangent to an arc concentric with the center of the gear are symmetrical, while the teeth on eccentric parts of the pitch line are unsymmetrical, the lack of symmetry being particularly marked in the tooth 15ª and those adjacent thereto. It will be seen that the curve of one side of the tooth 15ª is flatter than the curve of the other side of the tooth, and this is true to a greater or less extent to all those teeth which are on eccentric parts of the pitch line.

The purpose of the present invention is to furnish a cutter, which, when operated as a planing tool and also rotated about a fixed axis, while the gear blank is rotated in unison about a fixed axis, will generate the curves in the teeth 15, 15ª, etc. of the gear 11. It is my purpose to provide a cutter which may be used in machines of the general character of that shown in my prior Patent 1,028,343, in which the spindles of the cutter and work holder are at an invariable distance apart during the progress of the cutting operation after the depth feed has been completed, wherefore I have produced a cutter of which the peripheral projections are more or less distant from the indexing axis in complement to the varying eccentricity of the pitch line of the gear, and are variously formed accordingly so as to give the required form to the sides of the teeth cut in the gear blank. As these projections of the cutter are somewhat similar in form to gear teeth, and have been termed "teeth" in prior patents relating to this art, I will use this term in the further description of these parts of the cutter. It is to be understood that the edges of the teeth at one side or face of the cutter are formed as cutting edges so that the cutter may act as a planing tool when moved across the face of the work, as described in my prior Patent 1,028,343, and others. The cutter conjugate to the gear 11 is shown in Fig. 2 and is designated 17. It will be seen from inspection of this figure that the teeth of the cutter vary from one another in form and also in distance from the axis, the tooth 18 being the nearest to the axis of the cutter and having the widest end, and the tooth 18ª being farthest from the axis and having its end face reduced to practically a point, the intermediate teeth being more or less distant and having narrower or wider end faces according to their relation to the teeth 18ª and 18. The particular cutter illustrated in this figure is symmetrical on opposite sides of the diameter A, B, since the cutter is intended to generate teeth on a gear of which the lobes are symmetrical and equal. This cutter is able to cut all of the teeth on the gear 11 without requiring the axis of either the gear on the cutter to be shifted, because the irregularities of the gear lobes are no greater than the irregularity of the cutter. The several teeth of the cutter are respectively conjugate to corresponding teeth in each lobe of the gear, and the cutter makes as many rotations in generating all the teeth of the gear as there are lobes to the gear, in this case three.

Figs. 3 and 4 show an internal gear 19 having four equal and symmetrically arranged lobes, and associated therewith is a cutter 20 having teeth 21 which are designed to form the teeth 22 of any one of the lobes of the gear. In this gear the distances between the approximate centers of curvature of the lobes and the geometric center 23 of the gear are so great, that it is impossible to generate and cut all of the teeth of the gear or even of one lobe by rotating the gear about its geometric center, therefore the gear is rotated in cutting the teeth of each lobe about the approximate center of curvature of that lobe. 24 is the approximate center of the lobe with which the cutter happens to be in operative relationship as shown in Fig. 3. When the gear is in this relation to the cutter the center 24 is in the generating axis of the work holder. The cutter and work holder are rotated simultaneously in the manner usual with machines of the type shown in my patents aforesaid, during the progress of the succession of cuts made by the cutter. The curvature of the pitch line of the lobe of the gear is not exactly concentric with the point 24, but varies somewhat to either side of an arc described about the point 24 as a center. The teeth 21 of the cutter 20 are correspondingly more or less distant from the axis of the cutter and shaped so that the teeth they cut in the gear blank will be conjugate to the teeth of a regular pinion which are all at the same distance from the center of the pinion. The gear blank is rotated about the center 24 until as many of the teeth in one lobe are cut as can be made by the cutter 20, and then the work holder is shifted or indexed about the axis 23 to bring the centers 25, 26 and 27 successively into the generating axis, the gear being rotated about each of these centers 25, 26, and 27 in turn while teeth on the lobes of which these points are respectively the generating centers are cut.

The irregular gears shown in Figs. 1 and 4 represent the two different cases which can arise in the operation of gear cutting according to my present invention. In one of these cases the gear blank is rotated about its own center and the teeth of the cutter are sufficiently irregular in position to meet the extremes of irregularity in the pitch line of the gear blank. In the other case the gear blank is not rotated about its own center, but about different centers which are nearly the centers of curvature of the several lobes of the gear. All other forms and shapes of gear than these two here illustrated come under the one or the other of these cases, whether they are external or internal gears. In each case the cutter is conjugate to the teeth of one lobe of the gear with teeth distant from the generating axis according to the irregularity of the part of the gear blank on which they respectively act. The result accomplished by the use of my improved cutter is to produce an irregular gear of which the teeth are conjugate to the teeth of a standard pinion which is free to move, or with respect to which the irregular gear is free to move, in such a way that the normal distance from the axis of the pinion to the pitch line of the gear is always the same. The cutter which produces this effect is one having its teeth at varying distances from its axis of rotation and conjugate to the teeth of the irregular gear.

In Fig. 6 the blank for the irregular gear 19 is indicated roughly as mounted on a work holder 28 rotating about the axis of shaft 30. The work holder 28 carries a plate 31 to which the gear blank is fixed, said plate being adjustable with respect to the holder 28, about its center 29 which is in line with the center 23 of the gear blank. 32 represents the spindle to which the cutter 20 is secured and by which the latter is reciprocated and rotated. This diagrammatic representation of the relation between the cutter 20, gear blank 19 and work holder, is not intended to be taken as limiting my invention to any particular machine, but is given to aid in the explanation of the essential principles of the invention.

It will be evident from the foregoing description that the cutter consists in effect of a series of formed cutters, each of the tooth-like projections 18 of the cutter shown in Fig. 2, and 21 of the cutter shown in Figs. 4 and 5, being such a formed cutter, and that these several projections or cutting elements are arranged on a curved pitch line on the body of the cutter in a way somewhat similar to the manner in which the teeth of a spur gear are arranged on the pitch line of the gear. Each one of these cutting elements is capable of cutting in a particular part of the gear blank a groove conjugate to the tooth of a standard pinion, when given a rotatory generating movement about an axis which is unequally distant from different separated points in the said pitch line; that is an axis other than the approximate center of curvature of the pitch line. In the apparatus shown in Fig. 6, which illustrates as much of a standard gear cutting machine as is necessary to show the manner in which my cutter is employed to accomplish the results above described, the spindle 32 is a means for both rotating the cutter about its generating axis and for moving the cutter along such axis to give the required cutting movements thereto; and the shaft 30 is a means for giving the work a simultaneous generating movement about an axis at a fixed distance from the axis whereon the cutter is rotated. The shaft 30 and spindle 32 together constitute a means for producing relative cutting movements between the cutter and the blank.

It will be understood that the method carried out in cutting both types of gears illustrated in the drawings is essentially the same but with certain variations; these being mainly that the gear blank shown in Fig. 1 is given its rotatory generating movement about its geometric axis, while in the case of the gear shown in Figs. 4 and 6 the gear is given an incomplete rotation about the approximate center of curvature of one lobe in cutting the teeth on such lobe, and is then indexed and given a further generating rotation about the approximate center of another lobe, this indexing and further rotation being continued until the teeth are cut in all the lobes of the gear. The term "geometric axis" as used in the foregoing description is intended to be synonymous with the axis about which either the gear is designed to be rotated when in use or the axis about which a pinion meshing with the gear is designed to revolve.

The term "irregular" and words of like import used in the description of the gear and cutter are intended to include any form of gear or cutter in which the pitch line of its teeth or tooth-like projections is otherwise than concentric with the axis about which the gear is designed to be rotated in use, or the cutter to be rotated when generating the teeth which it cuts. As so used such terms have no relation whatever to symmetry or lack of symmetry, and they include forms which are symmetrical on opposite sides of a median line as well as forms which are not symmetrical.

What I claim and desire to secure by Letters Patent is:—

1. A cutter for gear cutting machines having a peripheral series of teeth, the cutting edges of which are shaped differently from one another and are located at different distances from the axis of rotation of the cutter.

2. A cutter for gear cutting machines having a series of peripheral tooth-like projections and adapted to generate and cut teeth in a blank, said tooth-like projections being arranged on a pitch line which is otherwise than concentric with the axis about which the cutter is adapted to be rotated in generating tooth curves.

3. A cutter for generating and cutting teeth in an irregular gear, such cutter having formed cutting elements arranged in a curved irregular pitch line.

4. A planing cutter for generating and cutting teeth in an irregular gear, said cutter having tooth-like cutting elements on its periphery arranged on a curved line, being operable to cut in a substantially axial direction, and having an opening for receiving the spindle or arbor on which said cutter is adapted to be mounted, such opening being eccentric to the approximate center of curvature of a line passing through corresponding points in all the cutting elements.

5. A cutter constructed for generating and cutting in a gear on an irregular pitch line teeth conjugate to a standard pinion, said cutter having peripheral cutting elements of which the cutting edges are generally similar to the outlines of standard gear teeth, but vary from exact identity with such teeth, and different elements being located at different distances from the axis of said cutter.

6. A cutter for generating and cutting tooth forms in an irregular gear, said cutter being of disk-like form having an aperture whereby it may be mounted upon a holding spindle, and having peripheral cutting elements at respectively different distances from the center of said aperture, or cutting edges of such cutting elements having generally the outline of standard gear teeth but varying therefrom according to their distances from the axis of said aperture.

7. A cutter for gear cutting machines having means for centering the same on a spindle or arbor and having peripheral cutting elements shaped as complete gear teeth arranged in a line which is irregular with respect to the axis of said centering means.

8. A cutter for gear cutting machines having a peripheral series of teeth arranged on an irregular pitch line.

9. A cutter for gear cutting machines having a peripheral series of teeth arranged on an irregular pitch line, the successive teeth being different in form from one another.

10. A cutter for gear cutting machines having a peripheral series of teeth arranged on an irregular pitch line, the successive teeth being different in form from one another and the opposite sides of certain teeth being unsymmetrical.

In testimony whereof I have affixed my signature, in presence of two witnesses.

EDWIN R. FELLOWS.

Witnesses:
E. W. MILLER,
R. M. FELLOWS.